US010033724B2

(12) United States Patent
Donohue

(10) Patent No.: US 10,033,724 B2
(45) Date of Patent: Jul. 24, 2018

(54) SYSTEM OF COMPOSITE PASSWORDS INCORPORATING HINTS

(71) Applicant: Ben Damian Donohue, Croydon Park NSW (AU)

(72) Inventor: Ben Damian Donohue, Croydon Park NSW (AU)

(*) Notice: Subject to any disclaimer, the term of this patent is extended or adjusted under 35 U.S.C. 154(b) by 70 days.

(21) Appl. No.: 14/672,820

(22) Filed: Mar. 30, 2015

(65) Prior Publication Data

US 2015/0281216 A1 Oct. 1, 2015

(30) Foreign Application Priority Data

Mar. 28, 2014 (AU) ................................ 2014901124

(51) Int. Cl.
*H04L 9/32* (2006.01)
*H04L 29/06* (2006.01)

(52) U.S. Cl.
CPC ........ *H04L 63/083* (2013.01); *H04L 63/0838* (2013.01); *H04L 63/105* (2013.01)

(58) Field of Classification Search
CPC .. H04L 63/083; H04L 63/105; H04L 63/0838
See application file for complete search history.

(56) References Cited

U.S. PATENT DOCUMENTS

| 6,954,862 | B2 | 10/2005 | Serpa | |
| 7,865,943 | B2* | 1/2011 | Hayler | G06F 12/1466 713/150 |
| 7,873,995 | B2* | 1/2011 | Bagga | G06F 21/46 380/44 |
| 8,024,791 | B2 | 9/2011 | Pakhunov | |
| 8,561,174 | B2 | 10/2013 | Fischer | |
| 2005/0250473 | A1* | 11/2005 | Brown | H04L 9/3271 455/411 |

(Continued)

FOREIGN PATENT DOCUMENTS

| EP | 2 278 525 A2 | 1/2011 |
| WO | 01/44916 A2 | 6/2001 |

OTHER PUBLICATIONS

First Examination Report dated Apr. 28, 2015 for Australian Application No. 2015201645.

*Primary Examiner* — Mohammed Waliullah
(74) *Attorney, Agent, or Firm* — Ladas & Parry LLP

(57) ABSTRACT

A system which generates composite passwords which can act to trigger a designated event; said system comprising a database having stored thereon at least first and second hints associated with at least respective first and second passwords, all of which are associated with a designated user; the system storing hints and passwords for multiple designated users and wherein each hint and password pair is generated by an association procedure whereby the password is uniquely derivable from the hint by the designated user with which that hint and password pair is associated; a composite password generated by the system presenting in a designated order of at least first and second hints to a designated user in response to which the designated user inputs respective first and second passwords to a local device thereby to assemble a composite password from the first and second passwords; the composite password then being stored on the local device.

17 Claims, 11 Drawing Sheets

(56) References Cited

U.S. PATENT DOCUMENTS

| | | | |
|---|---|---|---|
| 2006/0235764 A1* | 10/2006 | Bamborough | G06Q 30/02 705/14.36 |
| 2009/0241201 A1* | 9/2009 | Wootton | G06F 21/31 726/28 |
| 2010/0169958 A1 | 7/2010 | Werner et al. | |
| 2012/0144471 A1* | 6/2012 | Tsang | H04L 9/3226 726/7 |
| 2012/0198530 A1 | 8/2012 | Bodavula | |
| 2013/0024925 A1* | 1/2013 | Venkataramani | H04L 63/083 726/7 |

* cited by examiner

SYSTEM OF COMPOSITE PASSWORDS INCORPORATING HINTS

The present invention relates to a system of composite passwords derived from hints and, more particularly, although not exclusively, to such a system which, on verification of the composite password, acts to permit an event to take place such as, for example, authentication of a user sufficient to give access to a system.

BACKGROUND

The problem of trying to remember and keep secret passwords that enable access to private information is well known in the art.

In an attempt to help people use different passwords for different information access, such as access to a secure web site, some web publishers use a hint capability. This hint capability typically allows the user to write a short sentence or word to help them remember what password they will use in a future session. If they forget their password they are able to click a hint button that shows them a hint to help them remember the password and hopefully they can obtain access.

Another approach to increasing security with passwords is to encourage the use of long or complicated passwords. While more secure, the fact that the password never changes and is more difficult to remember than a simple password means that it may be harder for someone to guess the password, however if a thief is able to observe the user enter the password, by looking over the users shoulder while at work for example, the advantage of having a long password is lost.

European patent application EP 2278 525 to Fischer does describe a system based on hints however the described system is relatively complex and seeks to present the user with a bewildering array of true and false hints as part of the process of password entry. Furthermore, in preferred embodiments the system still comprises a username and conventional password (the prefix) entry to which is added a prompted password system (the suffix). As such the system still requires a user to remember an unprompted password and it is subject to attack by a key logger as are conventional username and password systems. That is the system requires a previously agreed password with each of the respective system.

WO2001044916 Microsoft (Sierra) PCT application shows the idea of a hint balloon that can show a hint or prompt associated with a password field for the purpose of reminding the user what the password might be. Again this system does not result in a different password for each login attempt and as such also suffers from risk of attack by a key logger.

U.S. Pat. No. 8,024,791 and U.S. Pat. No. 6,954,862 appear to show the idea of using hints on a per character basis. They do not show the idea of hints for an entire password. It is also not immediately clear whether the hints would prompt identification of the character in the mind of the user or whether they are just simply familiar images which you see when you are getting the character sequence entry correct (as opposed to unfamiliar or "false" images that you get if it turns out you are entering a wrong character sequence). Again this system does not result in a different password for each login attempt and as such also suffers from risk of attack by a key logger.

Technical Problems

A password can be overseen by others as it is being entered.

The password is the same for each entry (putting aside resetting the password which is rarely done for each occasion of its use). As such the password is open to compromise by a key logger programme.

The disabled may not be able to so easily use a pure alphanumeric password.

"strong" alphanumeric passwords are hard to remember.

It is not unknown for help desk personnel to be "tricked" into giving out alphanumeric passwords to unauthorised persons.

A user may be forced into disclosing their password—for example via threats

Embodiments of the present invention include features intended to address these issues. In particular, in preferred embodiments it is designed to provide a system where there is no need for a user to remember a password at all, only associations between hints and passwords. In preferred embodiments, the authenticating 'composite' password is different for substantially each and every user login session and statistically, highly likely to be different as between consecutive sessions. Particular preferred embodiments also secure the system to arbitrary levels against direct 'hacking' of passwords from database tables whilst also retaining the above referenced beneficial characteristics.

Notes

The term "comprising" (and grammatical variations thereof) is used in this specification in the inclusive sense of "having" or "including", and not in the exclusive sense of "consisting only of".

The above discussion of the prior art in the Background of the invention is not an admission that any information discussed therein is citable prior art or part of the common general knowledge of persons skilled in the art in any country.

BRIEF DESCRIPTION OF INVENTION

To address the issue of having secure access to private or secret information, a system of composite passwords including multiple key words with hints that protect the passwords used but allow users to easily remember the passwords is needed.

Definitions

Password: In this specification a password in a system where communication primarily utilizes Latin characters is an alphanumeric sequence which is utilized to authenticate a username, the username usually also expressed in Latin characters. In other alphabets, corresponding character sequences achieve the same result. Authentication of the username acts as an authentication trigger to permit an event to take place. Without limitation, the event may be the execution of an application; the event may be the decoding of a coded sequence; the event may be the grant of physical access to a system or location or structure.

Hint: In this specification a 'hint' is a mark which is not identical to the password but, on presentation to a user, can be uniquely associated by that user with a password. The mark may itself be an alphanumeric sequence but may also in addition or instead, and without limitation, comprise a picture, a photo, a sound, a vibration, a texture or any other perceptible communication which the user can perceive and uniquely associate with a password. The intention is that the association will be unique to that user—that is it is unlikely (but not impossible) that another user will associate the same password with the same mark. In the majority of cases it is expected that the hint of any given hint and password pair associated with a user will be based on experiences and/or knowledge unique to that user.

Composite password: In this specification a composite password is a password created by concatenation or other form of association of at least a first and second password thereby to form the composite password.

Hash: in this specification the term Hash will be used in the context of a cryptographic hash. A hash function maps digital data of arbitrary size to digital data of a fixed size/length. As used in cryptography the hash function is chosen such that, for the likely datasets to which it is to be applied relative to the output data sizes/length from the function it is highly likely that the hash of any given input digital data will be unique as against the hash of any other input digital data from the same dataset.

Salt: in this specification the term applies in a cryptographic sense to random data that is used as an additional input to the data (password) that is to be hashed.

transient: in this specification the term transient in relation to passwords or other forms of permission sequence is used in the sense of coming into existence for a one-time only use and not being effective for subsequent repeated use.

Accordingly, in one broad form of the invention, there is provided, a system which generates composite passwords which can act to trigger a designated event; said system comprising a database having stored thereon at least first and second hints associated with at least respective first and second passwords, all of which are associated with a designated user; the system storing hints and passwords for multiple designated users and wherein each hint and password pair is generated by an association procedure whereby the password is uniquely derivable from the hint by the designated user with which that hint and password pair is associated; a composite password generated by the system presenting in a designated order of at least first and second hints to a designated user in response to which the designated user inputs respective first and second passwords to a local device thereby to assemble a composite password from the first and second passwords; the composite password then being stored on the local device.

Accordingly, in a further broad form of the invention, there is provided, a system which generates composite passwords which can act to trigger a designated event; said system comprising a database having stored thereon at least first and second hints associated with at least respective first and second passwords, all of which are associated with a designated user; the system storing hints and passwords for multiple designated users and wherein each hint and password pair is generated by a hint and password pair generator which executes an association procedure stored as executable code in a memory operable in communication with a processor whereby the password is uniquely derivable from the hint by the designated user with which that hint and password pair is associated; a composite password generated by the system presenting in a designated order of at least first and second hints to a designated user over a communications medium to an input/output interface of a local device in response to which the designated user inputs via the said input/output interface respective first and second passwords to said local device thereby to assemble a composite password from the first and second passwords; the composite password then being stored on the local device sufficient for transient one time use by the system.

Preferably, all hints for a composite password are presented at the same time.

Preferably, each hint is associated with a password field into which the password derivable by the user from the hint is to be entered.

Preferably, each hint is associated visually with the password field.

Preferably, each hint is associated by close proximity to the password field.

Preferably, the designated event is authentication of the designated user sufficient to give the designated user access to a designated system.

Preferably, the designated system is a programme executable on a platform.

Preferably, the designated system is an appliance.

Preferably, the platform is a portable digital device.

Preferably, the portable digital device is a smartphone.

Preferably, the platform is a server.

Preferably, the platform is a personal computer.

Preferably, the event is triggered following a comparison procedure comprising communication between the local device and the database whereby the composite password is verified as matching a reconstituted composite password generated by the system from the same hints ordered in the designated order being the same order as presented to the designated user.

Preferably, the database is located on the local device.

Preferably, the database is located remotely from the local device.

Preferably, the database is located on a server.

Preferably, the server is accessible via the internet.

Preferably, the local device communicates over the internet to the database.

Preferably, the succession of hints in a designated order is presented on the local device.

Preferably, the succession of hints is entered in parallel so that all hints are displayed together and at the same time on the local device.

Preferably, the hints forming the succession are chosen randomly from a library of hints.

Preferably, the succession are chosen randomly for each authentication event.

Preferably, the composite password is passed through a hash function in order to generate a cryptographic hash of the composite password.

Preferably, authentication occurs by comparison of the hash of the composite password on the local device with a hash of the composite password on the database.

In a further broad form of the invention, there is provided, a method of generating a transient password which qualifies a user for a one time authentication as part of a login process; said password comprising a concatenation of at least two passwords; said at least two passwords generated by said user in response to perception of a corresponding hint; the hint associated with the password in a separate user set up process prior to said step of one time authentication.

In yet a further broad form of the invention system, there is provided, for encrypting and transmitting and receiving a message; said system comprising
a database having a lookup table containing a plurality of passwords; each password having associated therewith a hint;
sending a message to a receiver by the process of encrypting the message using a composite password of a designated user as a key;

associating the hint for that composite password with the encrypted message so as to prepare a composite message package for transmission;

transmitting the composite message over a medium to a receiver;

the receiver presenting the hint to the designated user;

the designated user deriving the composite password from the hints; said designated user providing it to the receiver;

the receiver utilising the composite password as a private key to decrypt the message.

In yet a further broad form of the invention system, there is provided, a method for deriving a password; said method comprising associating uniquely a hint with a password and the password with the same hint; presenting the hint to a user whereby the user derives the password from the hint; repeating the process at least once in order to thereby create a composite password.

Preferably, the composite password comprises a concatenation of the passwords.

In yet a further broad form of the invention system, there is provided, a method of determination of a composite password; said method comprising presenting a succession of hints to a candidate whereby the candidate assembles a composite password from successive passwords derived by the candidate from successive hints as they are presented; the hints having previously been associated with passwords by the candidate in a separate association procedure.

Preferably, the candidate assembles the composite password by concatenation of the successive passwords.

In yet a further broad form of the invention system, there is provided, a composite password generator including a database having stored thereon at least first and second hints associated with at least respective first and second passwords of a respective user;

the generator generating a sequence of at least first and second hints which correspond to a composite password.

DRAWINGS

FIG. 1—Main components of the example embodiment

FIG. 2—Main components of the composite password security system

FIG. 3—Control process of the generation of composite password security system FIG. 4—Control process for the production of multi password composite passwords FIG. 5—Is a block diagram of a system and the steps in its use in accordance with a further preferred embodiment.

DESCRIPTION AND OPERATION

Figure 1:
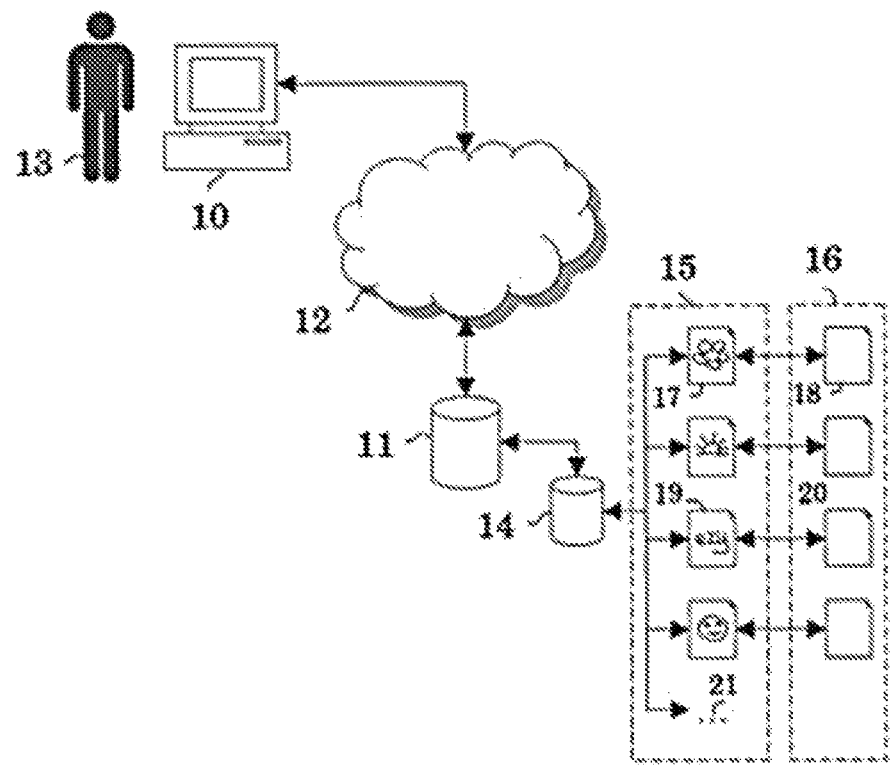

FIG. 1 discloses the main components of the example embodiment. A user 13 wishing to use a composite password system accesses the system 11 over a network 12 such as the Internet. A user management system 14 connected to the security system 11 links a number of passwords 16 and password hints 15 to the users identity 14 stored in the system 11.

The user 13 selects a series of hints 15 that are used to help remind them of chosen passwords 16 that will be used to gain access to secure information in the future. Each hint may include a picture, graphic or icon 17 or a word or words 19 which may help the user remember what the related password is in each case 18 20. For example a picture of a daisy 17 may remind the user of their grandmother who called her nanna. And the word nanna could be used as a related password 18. Conversely a word association as a hint such as ezy 19 could refer to the first three letters of the users first vehicle registration which was for a 'Ford' which could be the associated password 20 for the hint 19.

The number of hints and related passwords could be unlimited 21 and could include pictures, words, graphics, icons or even multimedia such as sounds that are supplied by the security system 11 or provided by the user themselves 13 in the form of pictures, photos and text that they add to the system as part of the setup of their password collection 16 and related hints 15.

Figure 2:
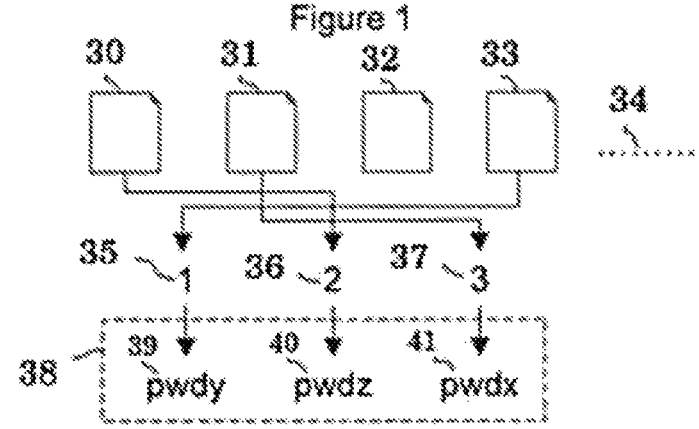

FIG. 2 discloses the main components of a composite password security system. In this system, visual hints 30 31 32 33 34 and their related individual passwords are selected randomly to compile a changing array of subset password combinations that can act as an identity authentication for secure systems.

In this example three hints and related passwords are randomly selected 35 36 37 to produce a compound combined authentication password 38. Initially a hint 33 and password 39 is randomly selected to be displayed to the user in the first position 35. Another combined hint 30 and password 40 is randomly selected and placed in the second position 36 of the combined password 38 and a third set of hint 31 and password 41 are placed in the third position 37.

In practice, the three hints 33 30 31 are presented to the user in a specific order 35 36 37 where the user is prompted to type in the related passwords in the same order within a compiled password field 38.

Only if the three related passwords 39 40 41 are entered into the password field 38 in the required order 35 36 37 will the security system allow access to the user.

Figure 3:
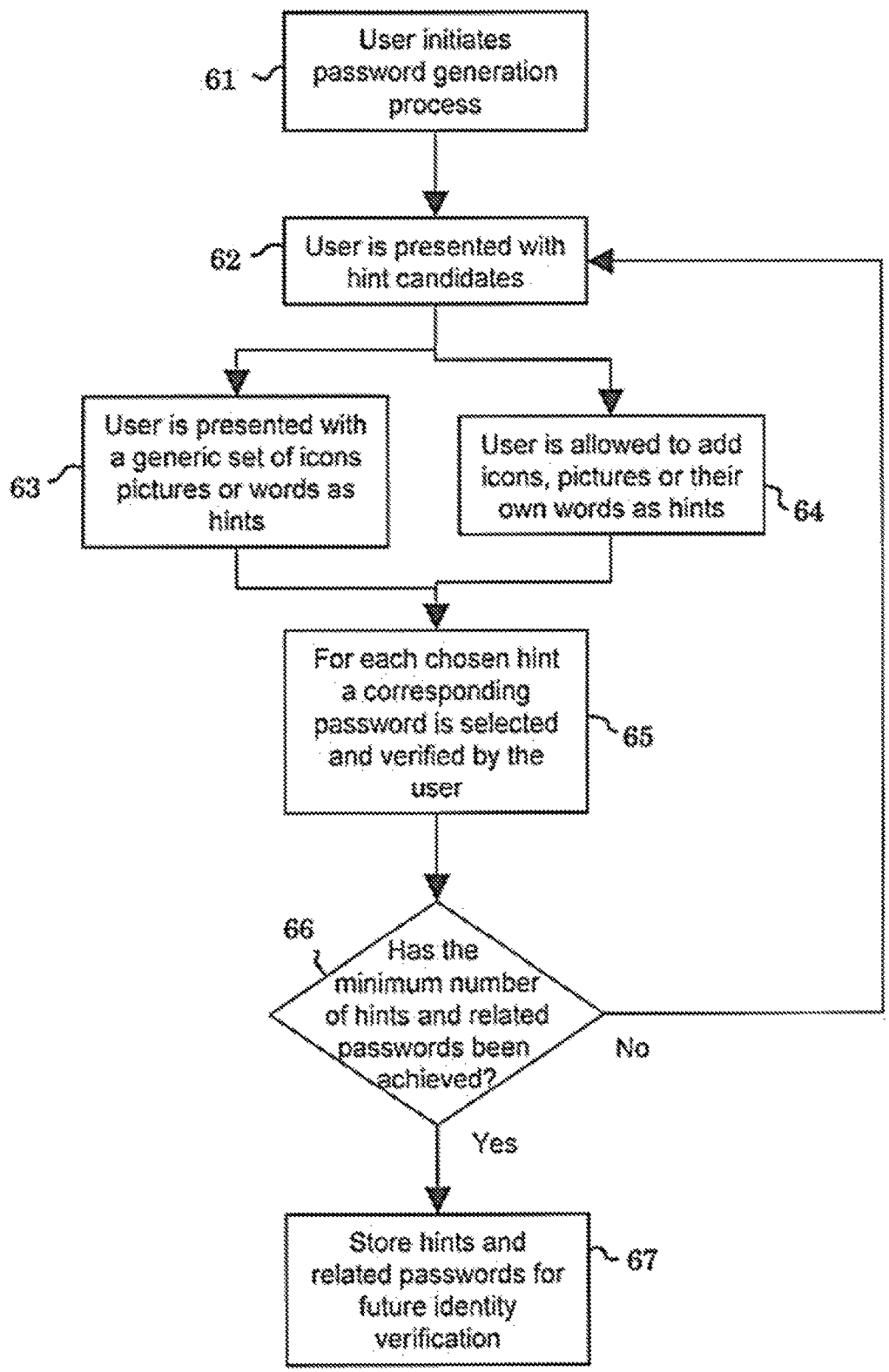

FIG. 3 discloses the control process of the generation of a composite password security system. Initially a user decides to add themselves to a secure system 61. The system presents the user with the opportunity to select from a variety of hints in order to generate associated passwords 62.

During this process, the user can choose one of a number of icons pictures or words as a password hint from a pool provided by the system itself 63 or alternatively, the user can be given the option 64 of providing their own pictures, icons or hint words with which to associate their generated password.

Once a hint has been chosen, a corresponding password must be associated and verified by the user 65. Verification is known in the art and usually involves a duplication of the password to verify that the user has typed the same password two times identically. After a hint has been chosen it is removed from the pool of possible hint selections in the future.

An example of a hint password association is that the user may select an icon of a daisy flower and associate that with their grandmother who loved daisies and who they called nanna, with nanna being the chosen password.

Next the system checks whether the required number of passwords for the password pool has been achieved 66. In this example, where a three password composite is required, the hint and password pool may have a minimum of ten or more. This is to ensure that a low incidence of duplication of the use of the same hints and passwords in consecutive composite passwords is ensured.

If the required number of passwords for the composite password pool has not been achieved the user is requested to add an additional hint and password combination 62.

If the required number of passwords has been achieved the system stores the hints and associated passwords for use in identifying the user in future authentication sessions.

Figure 4:
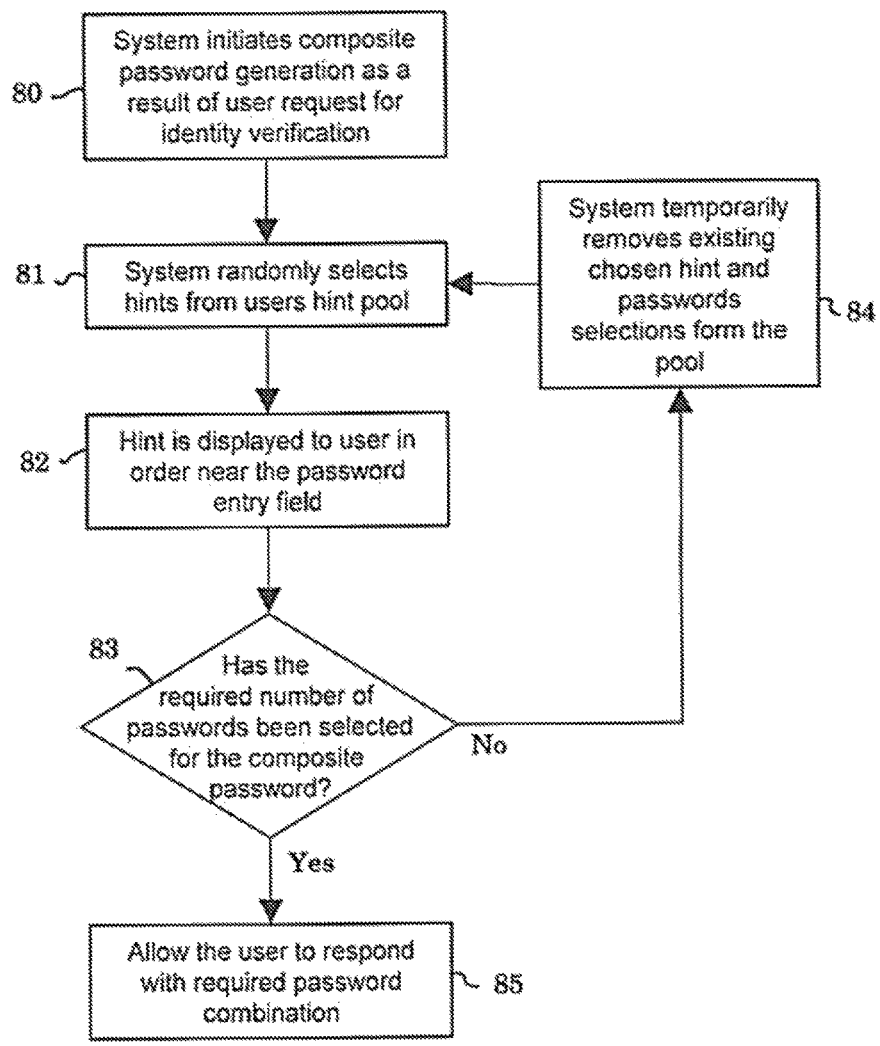

FIG. 4 discloses the control process for the production of multi password composite passwords. When a user connects to a secure system and or wishes to gain access to a secure information source under the control of the system, an identity verification process starts 80.

The system randomly selects hints and associated passwords from the hint and password pool 81 that the user has already set up 67.

The selected hint is then presented to the user in close proximity to the composite password entry field 82. The composite password entry field is typically a form field that allows for the entry of passwords without disclosing the word being typed. The characters are typically replaced with black circles as they are entered.

Next, the system checks if the minimum number of hinted passwords has been presented to the user 83. If not, the system removes the hints and passwords that have been used for the current composite password selection from the pool of available hints and passwords 84 and randomly chooses another hint and password for use 81.

In the example embodiment a total of three separate hints and passwords are randomly selected to produce a required composite password.

If the number of hints and related passwords has been reached, the user is allowed to then respond to the hints by entering the correct combination of passwords in the correct order 85.

The result is a composite password system that is relatively easy for the user to remember but allows for a wide variety of unique passwords that can be combined in a wide variety of combinations. This results in a situation where hackers or thieves holding a user under surveillance must be able to do so for an extended period of time and in a number of occasions to collect and store a pool of passwords for use in breaking into the users account.

ALTERNATIVE EMBODIMENTS

Figure 5:
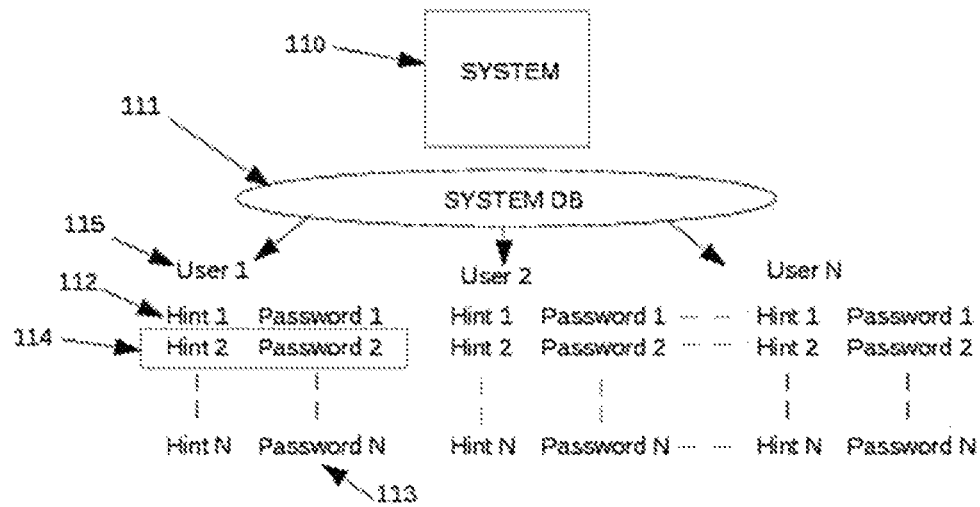
Figure 5:
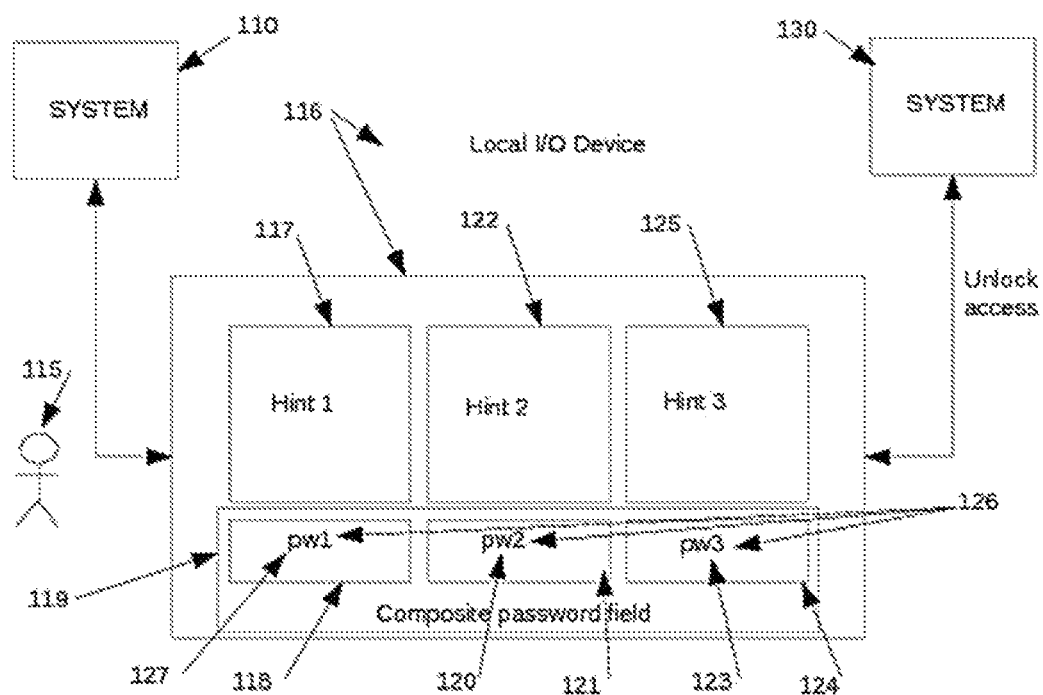

With reference to FIG. 5 there is illustrated a block diagram of a system and the steps in its use in accordance with a further preferred embodiment.

The system 110 comprises a system database 111 which includes stored thereon tables storing hints 112 and passwords 113 in sub tables where each sub table 114 is associated with a specific user 115.

The tables are populated with hints and associate passwords as described in earlier embodiments.

In use a user 115 seeking access to a local IO device 116 is presented with a first hint 117 to which the user 115 responds by inserting the corresponding password 127 into first field 118 of composite password field 119 followed by insertion of a second password 120 into a second field 121 of the composite password field 119 in response to a second hint 122 received from system 110. Finally, user 115 inserts a third password 123 into third password field 124 of the composite password field 119 in response to receipt of third hint 125 from system 110.

The completed composite password 126 from composite password field 119 is then communicated to system 110 which determines if there is a match of the concatenated password. If there is, then system 130 is unlocked and user 115 is given access there to.

The description with reference to FIG. 5 generates a composite password 126 derived from three concatenated passwords. Embodiments of the system envisage use of at least two concatenated passwords and may utilise many more than two or three depending on the resilience which any given application requires to attack.

The present invention or any part(s) or function(s) thereof, including, e.g., the local device, may be implemented using hardware, software, or a combination thereof, and may be implemented in one or more computer systems or other processing systems. A computer system for performing the operations of the present invention and capable of carrying out the functionality described herein can include one or more processors connected to a communications infrastructure (e.g., a communications bus, a cross-over bar, or a network). Various software embodiments are described in terms of such an exemplary computer system. After reading this description, it will become apparent to a person skilled in the relevant art(s) how to implement the invention using other computer systems and/or architectures.

The computer system can include a display interface that forwards graphics, text, and other data from the communication infrastructure (or from a frame buffer) for display on a display unit. The display interface can communicate with a browser. The computer system also includes a main memory, preferably a random access memory, and may also include a secondary memory and a database. The secondary memory may include, for example, a hard disk drive and/or a removable storage drive, representing a floppy disk drive, a magnetic tape drive, an optical disk drive, etc. The removable storage drive reads from and/or writes to a removable storage unit in a well known manner. The removable storage unit can represent a floppy disk, magnetic tape, optical disk, etc. which is read by and written to by the removable storage drive. As will be appreciated, the removable storage unit can include a computer usable storage medium having stored therein computer software and/or data.

The computer system may also include a communications interface which allows software and data to be transferred between the computer system and external devices. The terms "computer program medium" and "computer usable medium" are used to refer generally to media such as the removable storage drive, a hard disk installed in the hard disk drive, and signals. These computer program products provide software to the computer system.

Computer programs or control logic are stored in the main memory and/or the secondary memory. Computer programs may also be received via the communications interface. Such computer programs or control logic (software), when executed, cause the computer system or its processor to perform the features and functions of the present invention, as discussed herein With reference to FIG. 6A there is illustrated a block, part schematic diagram of data entry to the local device and interaction between the local device and database as can be applied to the system of FIG. 5 in accordance with a core embodiment, in a relatively simple form. This particular embodiment is suited, for example, where the database and local device are all part of a single device.

In this diagram like components are given same numbers as in FIG. 5.

As described with reference to FIG. 5, if a user of local device 116 desires access to a system protected by the composite password system of the present invention, the user enters a username or other form of identifier data into the local device sufficient that the local device may request a hint sequence 140 from the database 111 for that specific user i. The database 111 selects, in this instance randomly, three passwords PW1, PW2, PW3 and their corresponding hints Hint 1, Hint 2, Hint 3 and transmits the hints to the input output display of the local device where the hints are displayed in association with password entry fields. The user then enters the passwords into the composite password field 119 by association of the individual password components PW1 with Hint 1, PW2 with Hint 2 and PW3 with Hint 3. The composite password 119 thus entered by user i is compared with a linear concatenation of the corresponding passwords PW1, PW2, PW3 on database 111 stored against respective hints, 1,2,3 and if the two sequences match identically, then authentication is taken to have occurred and access to the system for user i is granted. It will be appreciated that user i, in this example, has not needed to remember a password or any component of it. The user i has simply needed to have undertaken a set up sequence on database 111, preferably via a data entry screen hosted by a server whereby the hints together with corresponding passwords that will tend to be unique for that user i according to their experiences are stored in the database. The user i then effectively creates a password 'on the fly' by entering passwords corresponding to the hints in the local device.

Figure 6A:
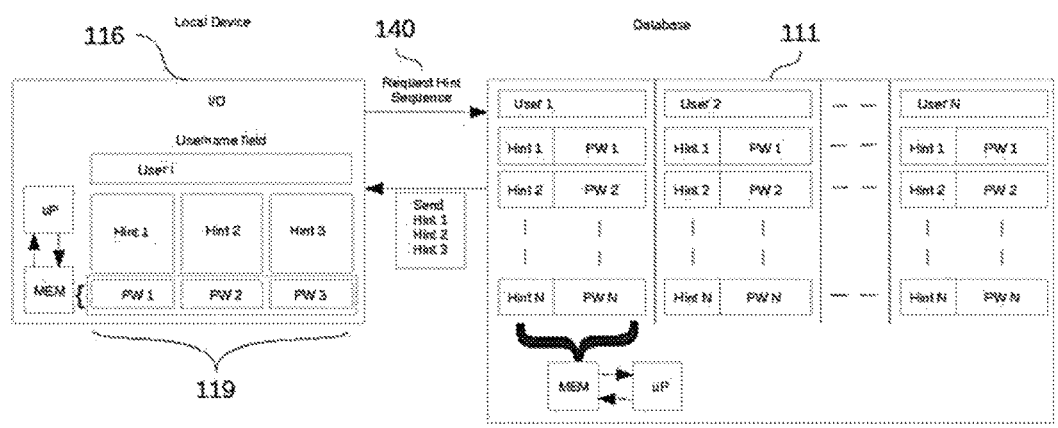
FIG. 6A is a block, part schematic diagram of data entry to the local device and interaction between the local device and database as can be applied to the system of FIG. 5
Figure 6B:
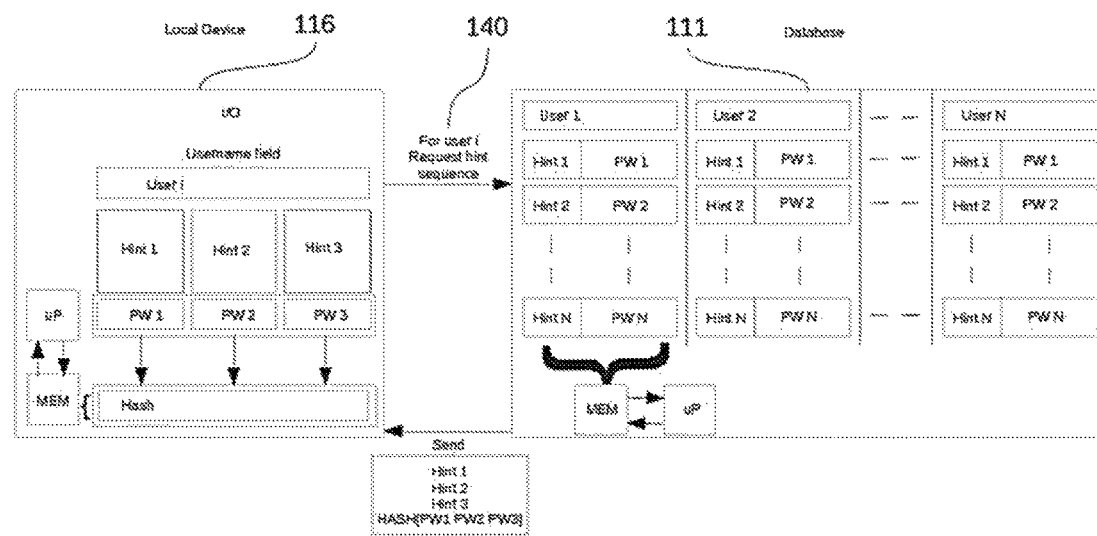
FIG. 6B illustrates diagrammatically the addition of hash function functionality to the system of FIG. 6A.

FIG. 6B illustrates diagrammatically the addition of hash function functionality to the system of FIG. 6A.

This arrangement can be useful where the database, for example, is geographically separated from the local device and it is preferred that the password sequence itself does not have to be transmitted externally to either the local device 116 or the database 111. In this case, the authentication algorithm is:

If passwords entered by user i which are then Hashed as Hash[PW 1 PW 2 PW 3] on Local Device match Hash[PW 1 PW 2 PW 3] in database of User i then trigger designated event for user i.

Figure 6C:
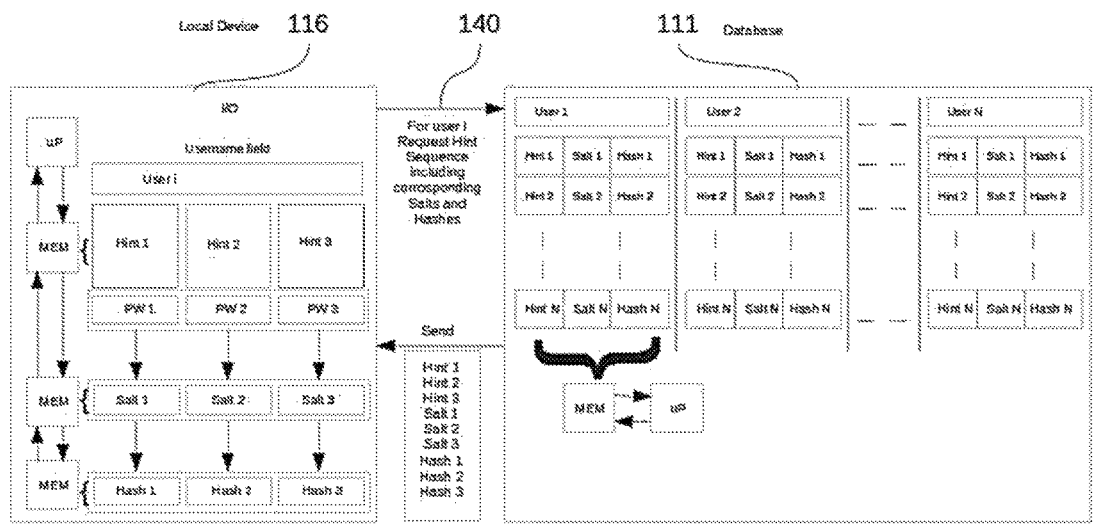
FIG. 6C illustrates diagrammatically the addition of salt data functionality to the system of FIG. 6B

FIG. 6C illustrates diagrammatically the addition of salt data functionality to the system of FIG. 6B which adds an additional level of security against hacking. In this instance the authentication algorithm is:

If [PW 1, PW 2, PW 3] entered by user i which is then Salted with the corresponding Salts [Salt 1, Salt 2, Salt 3] and is then hashed into corresponding Hashes [Hash 1, Hash2, Hash 3] on Local Device match [Hash 1, Hash 2, Hash 3] of user i in Database then trigger designated event for user i.

Figure 6D:
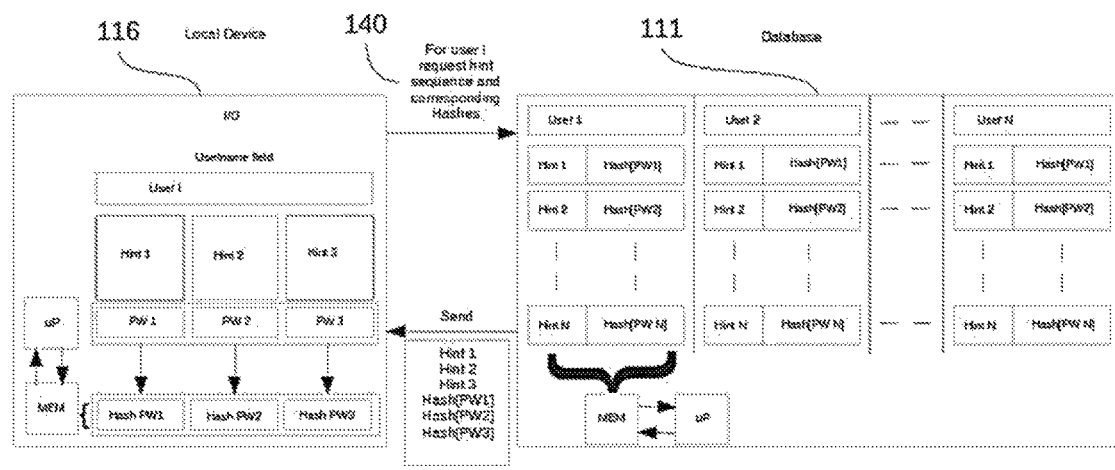
FIG. 6D illustrates hash function functionality applied to individual passwords thereby to protect the database from direct password attack

FIG. 6D illustrates a further arrangement of hash function functionality applied to individual passwords thereby to protect the database from direct password attack. In this instance, the authentication algorithm is:

Hints are displayed for user i. Hashes from Database are kept in memory ready for matching with Hashed input from user i.

If passwords of user i when Hashed as Hash[PW 1]Hash[PW 2]Hash[PW 3] of user i on Local Device match Hash[PW 1]Hash[PW 2]Hash[PW 3] of user i in Database then trigger designated event for user i.

Figure 6E:
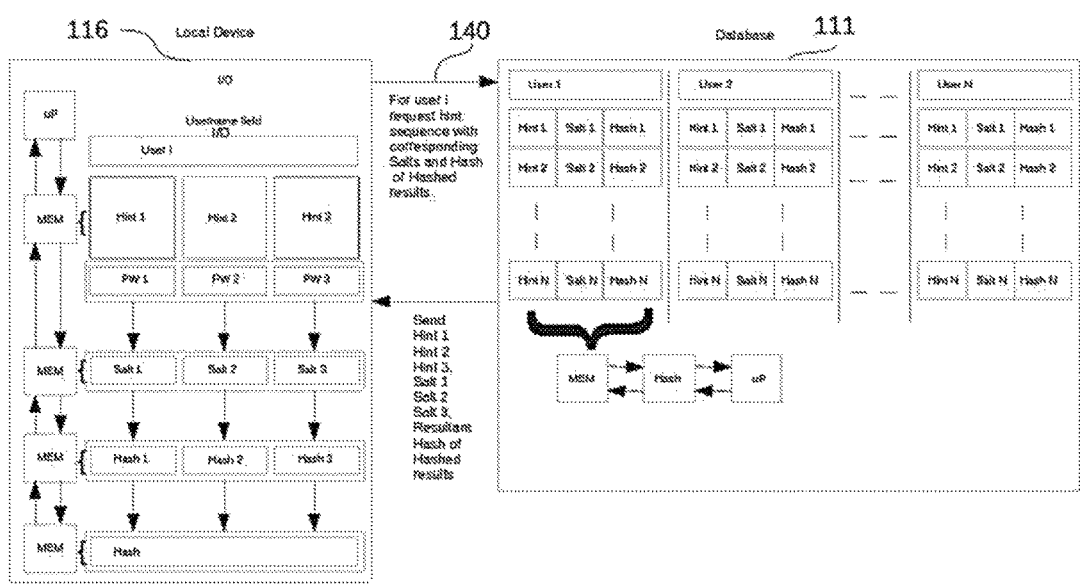
FIG. 6E illustrates a system combining hash and salt functionality

FIG. 6E illustrates a system combining hash and salt functionality wherein the authentication algorithm is:

If Passwords or user i which have been Salted and Hashed and then the result Hashed on Local Device match the Hash[Hash 1 Hash 2 Hash 3] of User i in Database then trigger designated event for user i.

The above embodiments illustrate a system which does not require a user to remember any particular system password and yet, their authentication and the underlined passwords that are associated with their unique hints can be protected against attack to an arbitrary level.

Figure 7:
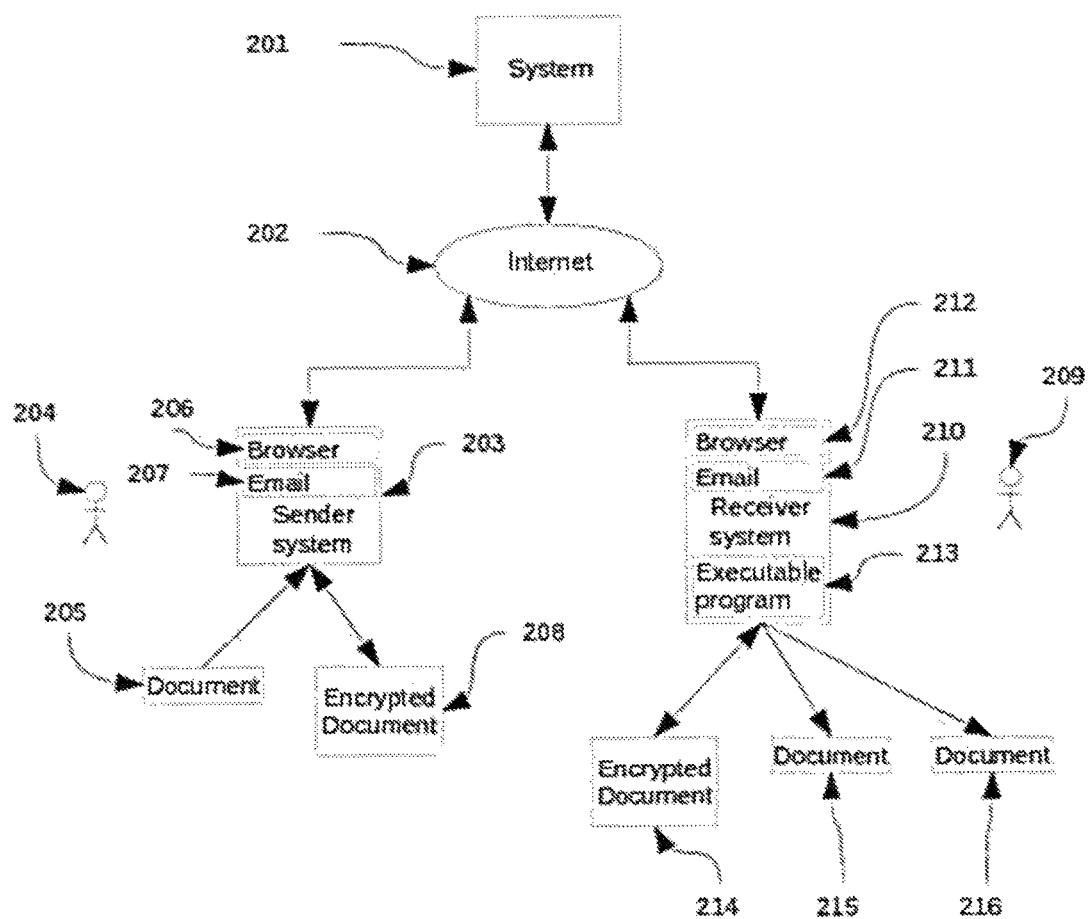
FIG. 7 is a block diagram of utilisation of the system applicable to document encryption.

One or more of these embodiments lend themselves with advantage to encryption of data utilizing the composite password 126, for example, as a symmetric key illustrated diagrammatically in FIG. 7 which is a block diagram of utilisation of the system applicable to, for example, document encryption.

Encrypted Document

The system of the present invention lends itself to sending an encrypted document or other type of file with encryption where the sender does not have to know the password or secret key prior to sending. For example, with reference to FIG. 7:

The receiver 209 has not been given any password from the sender 204.

The receiver 209 is not using public key/private key systems like, but not limited to Diffie-Hellman key exchange, RSA, DSS, S/MIME or GPG.

The receiver 209 is using a symmetric key algorithm but the advantage is that the sender 204 does not have to know in advance the secret key or password prior to sending to the receiver 209.

The sender 204 has a document that they want to be encrypted and sent to another user 209 over the internet 202.

After preparing the document 205, the sender 204 opens a web browser 206 on their system 203 and browses to the multifactor system 201 via the internet 202.

The sender 204 clicks on the service provided by the multifactor system 201 to encrypt a document 205 and then the user 204 can save the encrypted document 208 on their system.

The encrypted document 208 has embedded pictures and salts and hashes from the multifactor system 201.

The sender 204 then uses email 207 on their system 203 to email the encrypted document 208 via the internet 202 to the receiver system 210 to their email 211 for the receiver user 209.

The receiver 209 receives the encrypted document 214 via their email 211 on their system 210.

The encrypted document 214 is an exact copy of the encrypted document 8.

The receiver 209 can decrypt the encrypted document 214 two ways.

The first way to decrypt the encrypted document 214.

The receiver 209 on the receiver system 210 opens a browser 212 and browses to the multifactor system 201 via the internet 202.

The receiver 209 logs into the multifactor system 201 and requests to decrypt an encrypted document 214 that they have received via email 211 which is now on their system 210.

As the receiver 209 has logged into the multifactor system 201, the multifactor system 201 displays the images embedded into the document 14 and the receiver 209 then provides the answers into the password fields that correspond the hints that are displayed.

The multifactor system 1 then decrypts the encrypted document 14 and the receiver 209 can save the unencrypted document 15 onto the receiver system 10.

The second way to decrypt the encrypted document 214.

The receiver 209 runs and executable program 213 on the receiver system 210 and this executable program 213 opens the encrypted document 14 and displays to the receiver 209 the embedded pictures and password fields.

The receiver 209 provides the passwords that correspond to the embedded pictures.

The executable program 213 uses the provided salts that were embedded into the encrypted document 214 and hashes the passwords provided by the receiver 209.

If the hashes match the embedded hashes included with the encrypted document 214 then the encrypted document 214 is decrypted into the plaintext document 216.

Two Factor Authentication

In a further particular preferred form, a hint may itself be a trigger to derive a hint from another location. For example, the hint may be a picture of a telephone. In this case, a user seeing this hint would know to expect to receive a second factor hint on a second local device—for example a mobile phone. The second factor hint may be a 'normal' hint in the sense that it will prompt an association in the mind of a user which leads to the relevant associated password for entering into the composite password field. For example, the second factor hint may be a picture of a daisy with which the user associates the word 'nanna' which is the word which is inserted into the composite password field.

Distributed System

Figure 8:
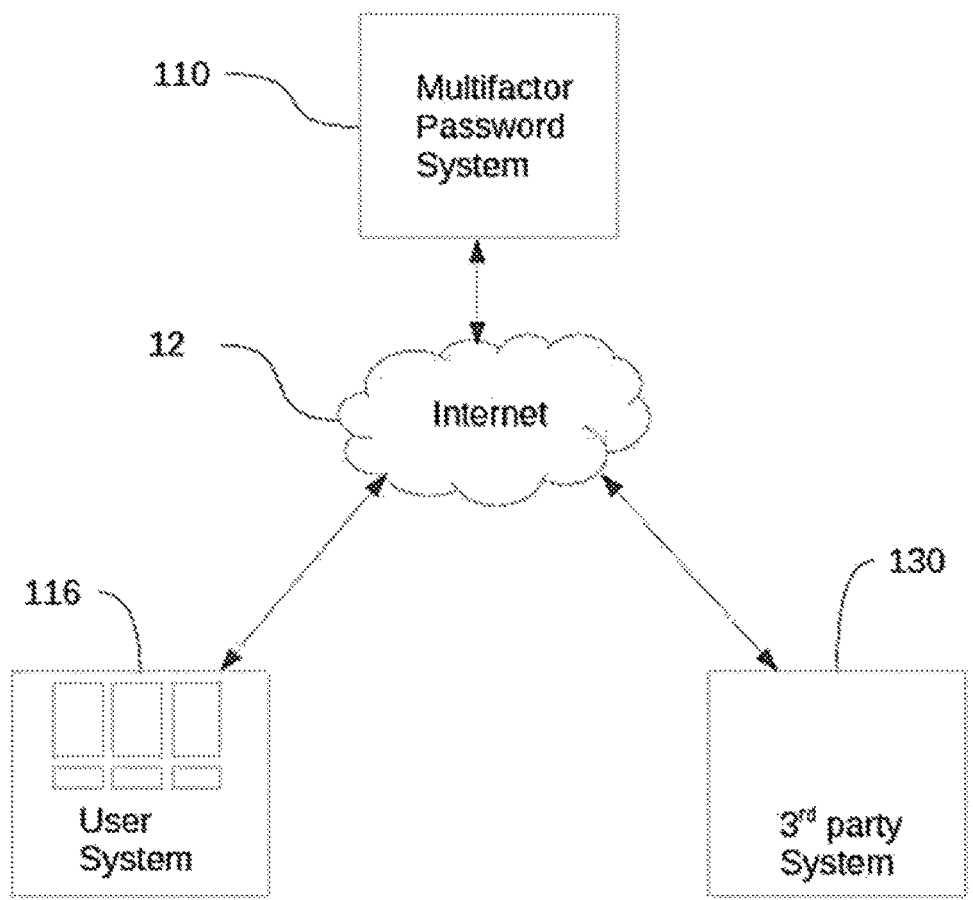
FIG. 8 is a block diagram of an embodiment of the system operable over the internet.

FIG. 8 is a block diagram of the system of FIG. 5 interconnected so as to operate over Internet 12 and wherein like components are numbered as for FIG. 5.

With reference to FIG. 8 and in this instance, after successfully answering the random 3 passwords, the multi-factor password system 110 allows the user access to the 3$^{rd}$ party system 130 which is located geographically separated from local device/user system 116 and, indeed, the password system 110 and its associated database 111. The 3rd party system 130 receives a token or some other identifier from password system 110 that that signifies that it may allow the user of local device 116 to access its system.

The 3rd party system 130 does not keep or store any password details of the user. It trusts the Multifactor Password System 110 that it has successfully authenticated the user.

Specific, but non-limiting scenarios will now be given:

Example Scenario 1

This example embodiment uses icons, pictures or words as possible hint media. An alternative embodiment could use anything as an alternative hint including but not limited to multimedia hints such as video snippets and sounds. The example embodiment uses text as a hint. An alternative embodiment could use text as a graphic or a string of text as a hint.

The example embodiment uses a pool of ten hints from which to compose composite passwords. An alternative embodiment could use any pool of one or more hints.

The example embodiment uses three hints and passwords in a random order from the pool of available hint and password combinations. An alternative embodiment could use any number of one or more hints and passwords from the pool to produce a composite password.

The example embodiment uses randomization to select what combination of hints and passwords are used to make up the composite compiled password. An alternative embodiment could use any means of selection of hints and passwords including but not limited to consecutive selection or the use of the least used hint.

The example embodiment excludes hints and passwords already used in the composite password from the pool of hints and passwords from which to generate remaining component passwords. An alternative embodiment may include the used hints and passwords in the current composite password in the pool from which to select remaining composite hints and passwords.

The example embodiment uses icons, pictures or words as possible hint media.

An alternative embodiment could use vibrations of the computer or phone or flashing of light on the phone to be used as a hint.

The System of Multifactor Passwords can be used for the delivery of encrypted content to a user without the use of public/private keys, nor the use of a shared password between two parties.

Example Scenario 2

The problem, for example, the distribution of a confidential document.

How does an entity currently deliver a confidential document to another entity?

Currently by encrypted email, encrypted DVD, or login/password to view the document or encrypting with public key for the other entity to unencrypt using their private key. In the case of a password to decrypt the document, the same password has to be known to both entities. So the password has to be conveyed to the other party.

How to do the delivery of encrypted content with the System of Multifactor Passwords.

For example, your document is ready to be emailed to the other entity. You have the email address of the other entity to send it to.

The other entity must have an account with the System of Multifactor Passwords. You have an identifier like an email address which is the others identity on the System of Multifactor Passwords.

You engage the System of Multifactor Passwords to encrypt the document along with the number of pictures, the salt for each picture and the hash of each picture. These things are embeded into the document. You don't need to know the decryption code or password of what is encrypted as the other entity knows it already. They will decrypt it using what they already know. The passwords are not conveyed with the encrypted document. Only the pictures, salts and hashes.

Upon receiving the encrypted document, the other entity may double click or otherwise try to open the encrypted document. The embedded pictures are shown to the other entity prior to decrypting the document. The other entity enters the password or passwords associated with the pictures in the correct order. These are then salted with the accompanied salt and hashed. The hash is compared with the hash embedded into the encrypted document. If a match, the document is decrypted. If not the document is not decrypted.

The file is symmetrically encrypted. That is, the same sequence of pictures and passwords is used to encrypt and decrypt the document.

The hashes may be concatenated or even the group of hashes may again be hashed to produce a single hash that is compared with a single hash embedded into the document.

This could also be used with video, sound and any other type of file that had to be securely shared between two parties.

The entities could pay for this service. Either the sending entity pays or the receiver pays or both.

The user after paying the purchase price, goes to their dropbox or other location or email and downloads the encrypted file.

The concatenated hashes should be the same as stored on the Systems computers.

The same concatenated hashes will decrypt the file and the user can view the content.

The content of the file does not have to be extracted, just readable or playable with the correct combination of the users already known passwords.

An option to permanently extract the file could be given.

Advantages.

No storage or management of public/private key files. Not normally something the average user is any good at anyway.

The sending entity does not need to generate a password and convey this to the receiving entity.

The sending entity does not need to know the receiving entities password invention service password.

The sending entity feels safe in that the user is hardly going to give out the confidential document or file along with their own personal passwords to anyone else that wants to view the file.

The above file is an example. This process can be done for the encrypted delivery of any media file where the password does not need to be known in advance or agreed to between users. Will work with any files. For instance but not limited to movies, music, confidential documents, games, money transfers, etc.

Example Scenario 3

Another use could be for two or more users needing to be present to view the content of a delivered file.

The file is encrypted with a combination of two or more users pictures/passwords and once delivered could be presented for group viewing. For example, if two people had to be present to view a file, then two picture/password combinations of two pictures from each person could be used for a total of four pictures. Each person would have to put in two passwords each to unlock the file. This same process could be used with any number of entities that needed to be present. For example if four people had to be present, to unlock the document, four pictures and passwords could be used. One for each person needing to view the file.

Example Scenario 4

An alternative embodiment could be the need for a confidential email to be sent. The sender not being able to set up secure public keys or send a preshared secret password to the other party. The email could be encrypted with the users Multifactor Passwords and delivered to the end user. Upon receipt, the user would see several pictures known to them in a random order. The user enters what they already know to be the passwords for each of the pictures. These responses are then salted and hashed and this is compared with a hash either embedded with the email or this is compared with a back end Multifactor Password server for comparison. If a match, the email is able to be read.

Example Scenario 5

With Internet of Things. (IoT)

For example a home owner has many internet enabled devices for controlling various aspects of the house.

Including but not limited to alarm, lights, heating, air conditioning, appliances, etc.

A master control box could be accessed by the home owner. This in turn controls all the internet connected devices around the home, office or premises.

Upon initial setup of the device, some pictures are downloaded to the device. These are then associated with a password with a salt and a hash.

The password is not stored on the device. Just the pictures, salts and hashes.

To alter the device from then on, the device would play back a random number of pictures to the home owner.

The home owner would reply with the password or phrases associated with each picture.

This is then salted and hashed by the master box or the IoT device and this hash is sent to the IoT device.

If verified, the device could then be reconfigured.

Very secure for an internet connected device or an IoT device.

Another example is starting up a car or some other type of vehicle.

A series of pictures are relayed to the user in the same way.

The driver has to pass the test of the images to be able to drive the car.

Another example is entering a house or building.

A series of pictures are relayed to the user in the same way.

The person has to pass the test of the images to be able to enter a house or building.

Another example is the picture password could be used instead of a pin at point of sale to authenticate the card owner.

Another example is that the password would not be stored in the database. The password would be salted and hashed and kept on an individual database.

So the password is not kept on the database. Only the pictures, salts and hashes are kept on the database.

There could be several databases where only one picture/hash combination is on a server.

The above describes only some embodiments of the present invention and modifications, obvious to those skilled in the art, can be made thereto without departing from the scope and spirit of the present invention.

INDUSTRIAL APPLICABILITY

Embodiments of the invention may be applied wherever only selective access to a particular system is desired. The system may be a software system such as a computer program operating on a platform. The system may be an appliance. The system may be a location.

The invention claimed is:

1. An authentication system which generates composite passwords which can act to trigger a designated event,
the system comprising a database having stored therein for at least one designated user a hint and password pool comprising at least first and second hint and password pairs, each hint and password pair comprising firstly a hint and secondly either a password or information derived substantially uniquely therefrom, and wherein:
- each hint and password pair is generated in an initial enrollment procedure wherein the designated user with which the hint and password pair is to be associated enters a password to be associated by the designated user with a hint and said hint and the associated password are then used to derive the hint and password pair;
- each hint and password pair comprises a hint and a cryptographic hash of an entered password as opposed to the hint and the entered password itself, the cryptographic hash being derived by hashing the entered password using a hash function;
- the system, whenever requested to authenticate a designated user, randomly selecting from the hint and password pool of that designated user at least first and second hint and password pairs to thereby produce a composite password comprising a concatenation in a specific order of the passwords of the selected hint and password pairs;
- the system then transmitting to and presenting on a local device in the specific order the hints from the selected hint and password pairs, each hint being presented in association with a password field, each password entered at the local device in response to a hint from a hint and password pair is hashed using the hash function and the designated event is triggered when the resulting hash of each entered password matches the hash of the password of the corresponding hint and password pair as stored on the database; in response to which the designated user must enter the password associated with each hint in the password field associated with that hint, the passwords entered at the local device in response to hints from selected hint and password pairs being passed through the hash function and the hashes thereby generated being concatenated into a string which is then itself passed through the hash function; and
- the hash of the hashes of the entered passwords being compared with a hash of the hashes stored in the database for the selected hint and password pairs and the designated event is triggered by a match between the two hashes of hashes.

2. The authentication system of claim 1, wherein the designated event is triggered when a test shows that the composite password entered on the local device matches the composite password generated by the system from the passwords of the selected hint and password pairs in the specific order.

3. The authentication system of claim 1, wherein all hints for a composite password are presented at the same time.

4. The authentication system of claim 1, wherein each hint is associated visually with a password field into which the password derivable by the user from the hint is to be entered when authentication by the authentication system is sought.

5. The authentication system of claim 4, wherein each hint is associated visually with the password field by being presented in close proximity thereto when authentication by the authentication system is sought.

6. The authentication system of claim 1, wherein the hint and password pool of a designated user comprises more hint and password pairs than are required to produce the composite password.

7. The authentication system of claim 1, wherein the designated event is authentication of the designated user to give the designated user access to a designated system.

8. The authentication system of claim 7, wherein the designated system is a program executable on a platform.

9. The authentication system of claim 7, wherein the designated system is any of an appliance, a smartphone, a computer, or a digital device.

10. The authentication system of claim 8, wherein the platform is a server.

11. The authentication system of claim 1, wherein:
- each hint and password pair in the database comprises a hint and a cryptographic hash of a password entered and then salted with a salt as opposed to the hint and the entered password itself, the cryptographic hash being derived by hashing the entered and salted password using a hash function; and
- the salt is generated by the authentication system, is stored in the database in association with the hint and password pair, and is unique to the hint and password pair.

12. The authentication system of claim 1, wherein the database is located remote from the local device.

13. The authentication system of claim 1, wherein in the enrollment procedure hints for possible use in hint and password pairs are selected from a library of hints.

14. The authentication system of claim 1, wherein when authentication is requested random selections of hint and password pairs made in producing the composite password are made successively, with each said random selection being made from among the hint and password pairs not previously selected in the process of producing the composite password.

15. The authentication system of claim 14, wherein the database is located remote from the local device.

16. The authentication system of claim 1, wherein hints for possible use in hint and password pairs are able to be uploaded by a user.

17. A method for authenticating a designated user as part of a login process, comprising executing the following steps in response to an authentication request:
- randomly selecting at least first and second hint and password pairs from a portion of a database specific to the designated user and comprising a pool of hint and password pairs each hint and password pair comprising firstly a hint and secondly either a password associated with the hint by the designated user or information derived substantially uniquely from the password;
- each hint and password pair comprising a hint and a cryptographic hash of an entered password as opposed to the hint and the entered password itself, the cryptographic hash being derived by hashing the entered password using a hash function;
- generating a composite password comprising a concatenation in a specific order of the passwords of the selected hint and password pairs;
- presenting in the specific order on a local device the hints associated with the selected hint and password pairs, each hint being presented in association with a password entry field whereby the composite password can be entered by the designated user entering the password corresponding to each presented hint in the password entry field associated with that hint;
- each password entered at the local device in response to a hint from a hint and password pair being hashed using the hash function and the designated event being triggered when the resulting hash of each entered password matches the hash of the password of the corresponding hint and password pair as stored on the database; and the passwords entered at the local device in response to hints from selected hint and password pairs being passed through the hash function and the hashes thereby generated being concatenated into a string which is then itself passed through the hash function; and the hash of the hashes of the entered passwords being compared with a hash of the hashes stored on the database for the selected hint and password pairs and the designated event being triggered by a match between the two hashes of hashes.

\* \* \* \* \*